Nov. 16, 1954  L. E. RUSSELL  2,694,610
DETACHABLY MOUNTED TRAY FOR AUTOMOBILES
Filed July 3, 1951
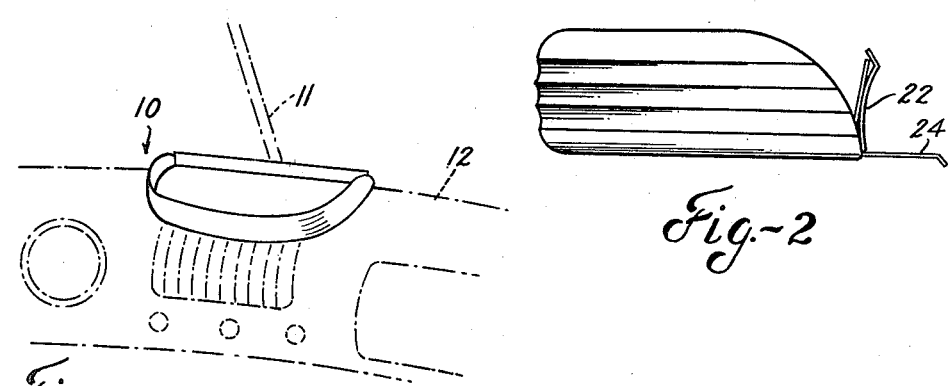
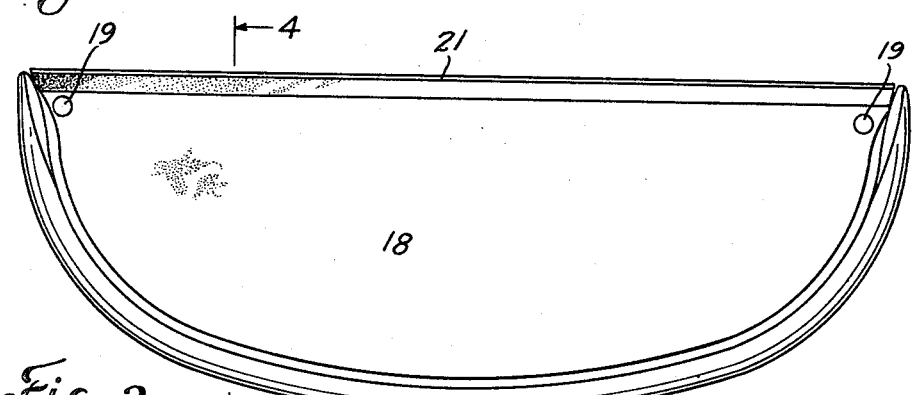
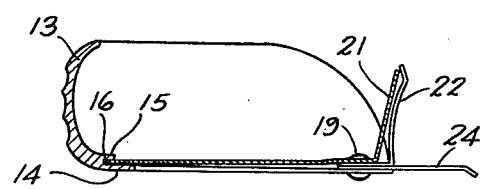
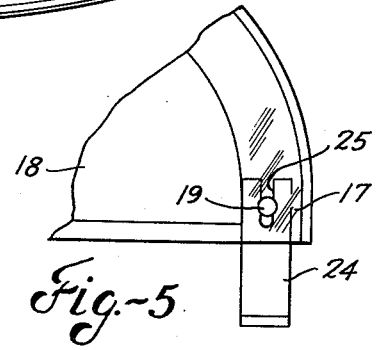
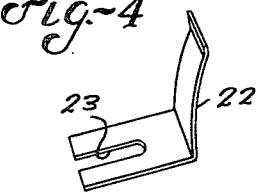
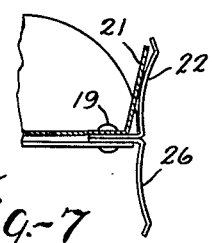
Inventor
Linus E. Russell
Tom Walker
Attorney 2,694,610
Patented Nov. 16, 1954

UNITED STATES PATENT OFFICE 2,694,610

DETACHABLY MOUNTED TRAY FOR AUTOMOBILES

Linus E. Russell, Springfield, Ohio, assignor to Peters & Russell, Inc., Springfield, Ohio, a corporation of Ohio Application July 3, 1951, Serial No. 234,943

6 Claims. (Cl. 311—21)

This invention relates to trays and particularly to automobile accessory trays constructed and arranged for mounting on the shelf afforded by the offset relation between the windshield and the instrument panel.

The object of the invention is to simplify the construction as well as the means and mode of installation of trays, whereby such trays may not only be economically manufactured, but will be more efficient and satisfactory in use, adaptable to a wide variety of installations, having relatively few parts and be unlikely to get out of repair.

Another object of the invention is to provide for quick and easy mounting and demounting of the tray.

A further object of the invention is to enable an easy partial disassembly of the tray for cleaning purposes.

Still another object of the invention is to adapt the tray for installation in various ways, as in connection with the defrost vent or the windshield molding.

A still further object of the invention is to incorporate in the tray assembly attachment members which may be semi-permanently installed and with respect to which the tray proper may be readily attached and detached.

With the above primary and other incidental objects in view as will more fully appear in the specification, the invention intended to be protected by Letters Patent consists of the features of construction, the parts and combinations thereof, and the mode of operation, as hereinafter described or illustrated in the accompanying drawings, or their equivalents.

Referring to the accompanying drawing, wherein is found the preferred but obviously not necessarily the only form of embodiment of the invention, Fig. 1 is a perspective view of a tray in accordance with the instant invention, installed in an automobile;

Fig. 2 is a view of the tray in side elevation;

Fig. 3 is a view of the tray in top plan;

Fig. 4 is a view in cross section, taken substantially along the line 4—4 of Fig. 3;

Fig. 5 is a fragmentary view of the tray, taken from the underside thereof;

Fig. 6 is a detail view of a backing member comprising a part of the tray assembly; and Fig. 7 is a view similar to Fig. 4, showing a modified form of tray fastening or attachment member.

Like parts are indicated by similar characters of reference throughout the several views.

Referring to Fig. 1 of the drawings, a tray 10 in accordance with the instant invention is particularly suited for mounting in an automobile on the shelf afforded by the offset relation between the windshield 11 and the instrument panel 12.

In its structure, the tray 10 comprises a body portion 13 curved about a longitudinal axis to an approximately C-shape to define the front and side walls of the tray. In cross section, the body 13 has a concavo-convex formation and the outer surface theref may display a suitable ornamentation, as suggested in Figs. 2 and 4.

The upper edge of the body slopes downward at its ends. The lower edge is turned inward to define a flange 14 extending over the full length of the body. In overlying spaced relation to the flange 14 is another flange 15 defining with the flange 14 a slot or crevice 16. The overlying flange 15 tapers outward at its outer ends, terminating short of the ends of the body 13 whereby to define on the ends of the flange 14 open lands 17.

The body 13 of the tray may conveniently and inexpensively be made of a molded plastic or like material, relatively firm but providing for some flexibility. The bottom of the tray is represented by a flat sheet 18 of paperboard or like material, the upper surface of which may be overlaid with a green baize. Considering the sheet 18 as having inner and outer ends, the inner end is curved in conformance with the curvature of the body 13 and the edge thereof is received in the crevice 16. The sheet extends in overlying projecting relation to the lands 17 at which points it is secured to the flange 14 by rivets 19. The outer end of sheet 18 projects beyond the ends of the body 13 and is straight or square shaped. Further, such projecting end is bent along a transverse line, substantially coincident with the plane of the ends of the body, thus providing an upright tab 21 representing the back wall of the tray.

To back up the tab 21 there is provided a pair of right angle brackets 22 having one arm extending upward in bracing relation to the tab 21 and the other arm received between the sheet 18 and a respective end of the flange 14, the said other arm containing a notch or slot 23 so that it may slide in embracing relation to the rivet 19. Being thus merely frictionally held on the body 13, the backing members 22 may be easily removed so that the tab 21 can be straightened and the bottom of the tray be brushed clean.

For attachment purposes there may be provided a choice of slips or members, for example the one shown in Figs. 2, 4 and 5 or the one shown in Fig. 7. In the former instance the attachment member consists of a straight bracket 24 having at one end a notch or slot 25 corresponding to the slot 23 in the backing members 22. In the latter instance, the attachment member consists of a right angle bracket 26 which is similar to and may be merely another one of the backing members 22. In installing the straight bracket 24, the notched end thereof is inserted in registering underlying relation to a respective backing member 22, between the sheet 18 and flange 14. There it is held frictionally against withdrawal, with the projecting end thereof arranged to be anchored to a suitable place in the automobile, as in the defrost vent or under the windshield molding. In the case of the angle bracket 26, it is arranged in inverse relation to a respective backing member 22 with its notched arm in underlying contacting relation to the corresponding arm on the backing member and received with it in frictional engagement between the sheet 18 and flange 14. The other arm projects downwardly in divergent relation to the corresponding upstanding arm as the backing member. It will be apparent that a feature of the attachment members is that they may be permanently or semi-permanently installed in the automobiles, while the tray is attachable to and detachable from the members by simple pushing and pulling motions.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect.

Having thus described my invention, I claim:

1. A tray for an automobile of the type having a windshield offset relatively to the instrument panel affording a supporting shelf thereabove, including a curved body made of a plastic or like material and defining the front and side walls of the tray, one longitudinal edge of said body being turned inward to define a flange, a flat sheet of paperboard or like material having one end curved in conformance with the curvature of said body and the opposite end straight, said sheet defining the bottom of the tray with the curved end thereof being received within the curvature of the body and supported by said flange and the opposite end projecting beyond the ends of the body, such projecting end being bent to an upright position to define the back wall of the tray, fasteners securing the paperboard sheet to said flange, and relatively rigid angle shaped backing members, each having an arm received between said sheet and the respective end of said flange and another arm extending into supporting relation to the projecting upright end of said sheet.

2. A detachable tray according to claim 1, characterized by attachment members interchangeable with said backing members, said attachment members having one arm received as the corresponding arm of said backing member and the other arm extending in inverse relation to the corresponding arm of the back member for attachment of the tray in the automobile.

3. A detachable tray according to claim 1, characterized by attachment members frictionally received between said sheet and the ends of said flange and projecting from said flange, said tray and attachment members being separable by pulling upon the tray for ease of cleaning thereof.

4. A detachable tray for selective detachable mounting, as in an automobile, including a curved body made of plastic or like material and defining the front and side walls of the tray, one longitudinal edge of said body being turned inward to define a flange, another flange on said body in overlying spaced relation to the first said flange and defining therewith a slot, a flat sheet of paperboard or like material having one end curved in conformance with the curvature of said body and received in said slot, the opposite end of said sheet being straight and projecting beyond the ends of said body, said projecting end being turned to an upright position, said sheet of paperboard thus defining the bottom of the tray and the back wall thereof, backing members mounted on the ends of said body engaging and supporting the projecting end of said sheet, and other members similarly mounted for use in attaching the tray.

5. A detachable tray according to claim 4, characterized in that said backing members and said attachment members are in the form of interchangeable angle brackets, said members being disposed in pairs of one backing member and one attachment member arranged in back-to-back inverse relation to one another with corresponding arms superimposed touching relation received between the paperboard sheet and the first said flange and other arms extending in outwardly divergent relation with respect to the plane of said sheet.

6. A detachable tray according to claim 4, characterized in that said other members are in underlying aligned relation to said backing members and project beyond the ends of said body in approximately planar relation thereto.

References Cited in the file of this patent

UNITED STATES PATENTS

| Number | Name | Date |
|---|---|---|
| D. 163,954 | Kulwin | July 17, 1951 |
| 713,724 | Wagar | Nov. 18, 1902 |
| 1,135,269 | Dudley | Apr. 13, 1915 |
| 1,801,637 | Nichols | Apr. 21, 1931 |
| 1,946,967 | Douglas | Feb. 13, 1934 |
| 2,299,025 | McGinley | Oct. 13, 1942 |
| 2,438,505 | Hunt | Mar. 30, 1948 |
| 2,536,084 | Peters et al. | Jan. 2, 1951 |
| 2,584,557 | Cuthbertson | Feb. 5, 1952 |
| 2,607,205 | Morris, Sr. | Aug. 19, 1952 |

FOREIGN PATENTS

| Number | Country | Date |
|---|---|---|
| 443,389 | Great Britain | Feb. 27, 1936 |
| 475,680 | Great Britain | Nov. 24, 1937 |